(12) United States Patent
Chida et al.

(10) Patent No.: US 12,158,949 B2
(45) Date of Patent: Dec. 3, 2024

(54) GRAPH-ASSOCIATING SYSTEM AND GRAPH-ASSOCIATING METHOD

(71) Applicant: NIPPON TELEGRAPH AND TELEPHONE CORPORATION, Tokyo (JP)

(72) Inventors: Nariyoshi Chida, Musashino (JP); Yo Kanemoto, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 290 days.

(21) Appl. No.: 17/766,532

(22) PCT Filed: Oct. 10, 2019

(86) PCT No.: PCT/JP2019/040129
§ 371 (c)(1),
(2) Date: Apr. 5, 2022

(87) PCT Pub. No.: WO2021/070352
PCT Pub. Date: Apr. 15, 2021

(65) Prior Publication Data
US 2023/0131800 A1    Apr. 27, 2023

(51) Int. Cl.
*G06F 21/00* (2013.01)
*G06F 16/901* (2019.01)
*G06F 21/55* (2013.01)

(52) U.S. Cl.
CPC ........ *G06F 21/552* (2013.01); *G06F 16/9024* (2019.01); *G06F 2221/034* (2013.01)

(58) Field of Classification Search
CPC .............. G06F 21/552; G06F 16/9024; G06F 2221/034; G06F 16/906
See application file for complete search history.

(56) References Cited

U.S. PATENT DOCUMENTS

| | | | |
|---|---|---|---|
| 2009/0044106 A1* | 2/2009 | Berkner | G06F 40/103 707/999.102 |
| 2020/0059481 A1* | 2/2020 | Sekar | H04L 63/1425 |
| 2020/0104401 A1* | 4/2020 | Burnett | G06F 16/287 |

OTHER PUBLICATIONS

Swiler et al., "Computer-Attack Graph Generation Tool ", Proceedings DARPA Information Survivability Conference and Exposition II. DISCEX'01, Date of Conference: Jun. 12-14, 2001.*
King et al., "Backtracking Intrusions", SOSP, Oct. 19-22, 2003, pp. 223-236.
Liu et al., "Towards a Timely Causality Analysis for Enterprise Security", Network and Distributed Systems Security (NDSS) Symposium, Feb. 18-21, 2018, pp. 1-15.

* cited by examiner

*Primary Examiner* — Morshed Mehedi
(74) *Attorney, Agent, or Firm* — XSENSUS LLP

(57) ABSTRACT

A graph association system includes processing circuitry configured to construct a plurality of dependency graphs in which input logs are associated with each other, assign a tag to each of the dependency graphs constructed, and associate the dependency graphs with each other based on tags assigned.

14 Claims, 23 Drawing Sheets

Fig. 16

| Tactics | Tactics ID | SIGNATURE |
|---|---|---|
| Execution | 2 | Local¥Temp¥[]doc |
| Initial Access | 1 | doc[]ordownload |
| Execution | 2 | WINWORD[]EXE *C¥Users¥.*.*[]doc |
| Defense Evasion | 5 | icc[]ignorelist[]com video[]asmcpr[]com |

| Name | Description |
|---|---|
| Cherry Picker | Some variants of Cherry Picker use AppInit_DLLs to achieve persistence by creating the following Registry key: HKEY_LOCAL_MACHINE\SOFTWARE\Microsoft\Windows NT\CurrentVersion\Windows "AppInit_DLLs"="pserver32.dll" |
| T8000 | If a victim meets certain criteria, T8000 uses the AppInit_DLL functionality to achieve persistence by ensuring that every user mode process that is spawned will load its malicious DLL_PsN32.dll. It does this by creating the following Registry keys: HKLM\Software\Microsoft\Windows NT\CurrentVersion\Windows\AppInit_DLLs = %APPDATE%\Intel\ResN32.dll and HKLM\Software\Microsoft\Windows NT\CurrentVersion\Windows\LoadAppInit_DLLs = 0x1 ← TRACE |

Fig. 17

GRAPH-ASSOCIATING SYSTEM AND GRAPH-ASSOCIATING METHOD

CROSS-REFERENCE TO RELATED APPLICATION

The present application is based on PCT filing PCT/JP2019/040129, filed Oct. 10, 2019, the entire contents of which are incorporated herein by reference.

TECHNICAL FIELD

The present invention relates to a graph association system and a graph association method.

BACKGROUND ART

Conventionally, in the incident investigation, an analyst investigates the cause of the incident and the presence of information leakage by analyzing the logs collected from an environment where damage has occurred. In order to facilitate the investigation, several methods have been proposed in which logs with dependency are associated with each other to create a graph and the graph (hereinafter referred to as a dependency graph) is presented to an analyst.

For example, as a method of associating logs based on information representing the dependency between logs, a method of associating logs in reverse chronological order from the log that triggered the discovery of an attack to construct a dependency graph is known.

CITATION LIST

Non Patent Literature

[Non Patent Literature 1] Samuel T. King and Peter M. Chen, "Backtracking Intrusions", SOSP, 2003.
[Non Patent Literature 2] Yushan Liu et al, "Towards a Timely Causality Analysis for Enterprise Security", NDSS, 2018.

SUMMARY OF THE INVENTION

Technical Problem

However, the conventional method of constructing a dependency graph has a problem that the dependency graph may not be constructed appropriately. The conventional method of constructing a dependency graph is based on the premise that all OS-level actions performed on a terminal are recorded in the log. However, if all OS-level actions are recorded in logs, a huge amount of logs will be recorded, so only partial actions are recorded in an actual environment. Therefore, even if the existing method is used in the actual environment, the dependency graph to be constructed may include only a portion of the attacker's actions, and the dependency graph may not be constructed appropriately.

The present invention has been made in view of the above-mentioned problems, and an object of the present invention is to appropriately construct a dependency graph even when all OS-level actions are not recorded in logs.

Means for Solving the Problem

In order to solve the above-mentioned problems and achieve the object, a graph association system of the present invention includes: processing circuitry configured to: construct a plurality of dependency graphs in which input logs are associated with each other; assign a tag to each of the dependency graphs constructed; and associate the dependency graphs with each other based on tags assigned.

Further, a graph association method of the present invention is a graph association method, including: constructing a plurality of dependency graphs in which input logs are associated with each other; assigning a tag to each of the dependency graphs constructed; and associating the dependency graphs with each other based on tags assigned, by processing circuitry.

Effects of the Invention

According to the present invention, an effect that a dependency graph can be constructed appropriately even when all OS-level actions are not recorded in logs is obtained.

BRIEF DESCRIPTION OF DRAWINGS

FIG. 16 is a diagram illustrating an example of a signature for a tag.
FIG. 17 is a diagram illustrating an example of a signature acquired from ATT&CK.

DESCRIPTION OF EMBODIMENTS

Figure 1:
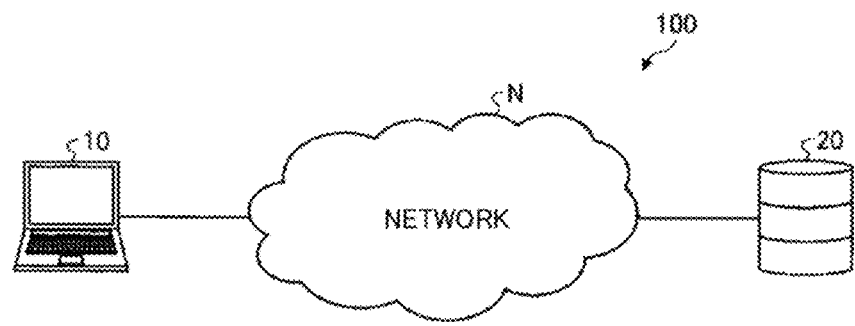
FIG. 1 is a diagram illustrating an example of a configuration of a graph association system according to an embodiment.

Hereinafter, an embodiment of the present invention will be described in detail with reference to the drawings. The present invention is not limited to this embodiment. Further, in the description of the drawings, the same parts are indicated by the same reference numerals.

Embodiment

Embodiments of the present invention will be described. In the embodiment of the present invention, a graph association system and a graph association method in which after tags are assigned to a plurality of dependency graphs, the dependency graphs are associated with each other using the tags, and dependency graphs representing a series of actions of an attacker are reconstructed will be described.

[Configuration of graph association system]

FIG. 1 is a diagram illustrating an example of the configuration of the graph association system according to the embodiment. For example, a graph association system illustrated in FIG. 1 has a configuration in which an information processing device 10 and a log holding device 20 are connected via a network N such as the Internet or a dedicated line.

The information processing device 10 is a terminal device used by an analyst for an investigation. The information processing device 10 constructs a dependency graph in which logs recorded before the log in which the attack was discovered are associated with each other among input logs. Then, the information processing device 10 assigns tags to the constructed dependency graphs, associates the dependency graphs with each other based on the assigned tags, and reconstructs the dependency graphs.

The log holding device 20 holds a log to be investigated by an analyst. The log holding device 20 provides an investigation target log to the information processing device 10 via the network N. The investigation target log may be held in the information processing device 10 rather than being held in the log holding device 20.

Figure 2:
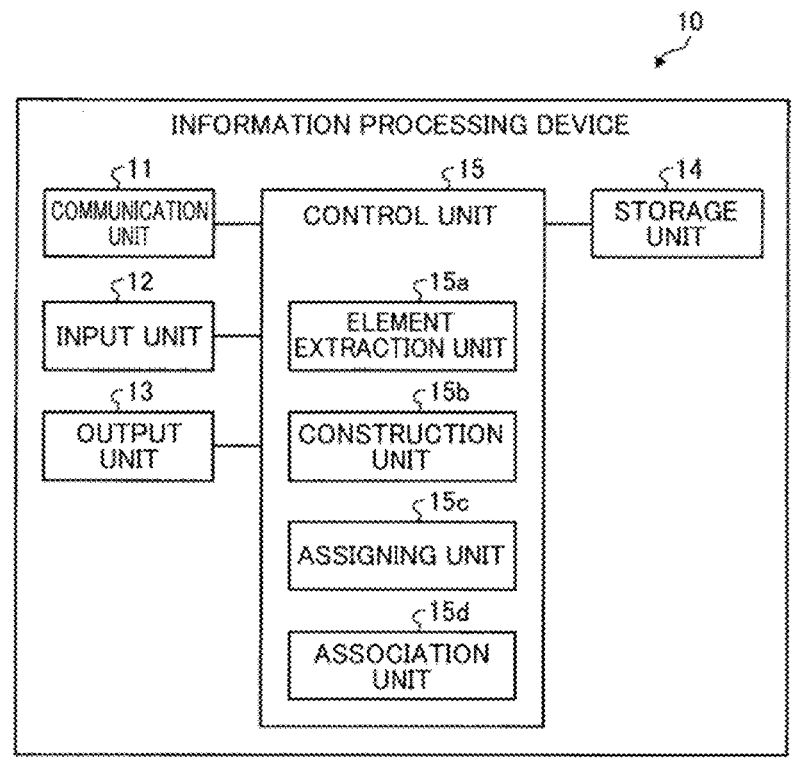
FIG. 2 is a diagram illustrating an example of a configuration of an information processing device illustrated in FIG. 1.

[Information processing device] Next, the configuration of the information processing device 10 will be described. FIG. 2 is a block diagram illustrating the configuration of the information processing device 10 illustrated in FIG. 1. As illustrated in FIG. 2, the information processing device 10 includes a communication unit 11, an input unit 12, an output unit 13, a storage unit 14, and a control unit 15.

The communication unit 11 is a communication interface for transmitting and receiving various pieces of information to and from other devices connected via a network or the like. The communication unit 11 is realized by an NIC (Network Interface Card) or the like, and communicates between another device and the control unit 15 via a telecommunication line such as a LAN (Local Area Network) or the Internet. For example, the communication unit 11 inputs the investigation target log (log file) input via the network N or the like to the control unit 15.

The input unit 12 is an input interface that receives various operations from the operator of the information processing device 10. For example, the input unit 12 is configured as an input device such as a touch panel, a voice input device, and a keyboard and a mouse.

The output unit 13 is realized by, for example, a display device such as a liquid crystal display, a printing device such as a printer, an information communication device, or the like. The output unit 13 outputs the reconstructed dependency graphs to the operator (for example, an analyst).

The storage unit 14 is realized by a semiconductor memory element such as a RAM (Random Access Memory) or a flash memory, or a storage device such as a hard disk or an optical disk, and stores a processing program for operating the information processing device 10 and data used during execution of the processing program.

The control unit 15 has an internal memory for storing a program that defines various processing procedures and the like and required data, and executes various processes with the aid of the program and data. For example, the control unit 15 is an electronic circuit such as a CPU (Central Processing Unit) or an MPU (Micro Processing Unit). The control unit 15 has an element extraction unit 15a, a construction unit 15b, an assigning unit 15c, and an association unit 15d.

Figure 3:
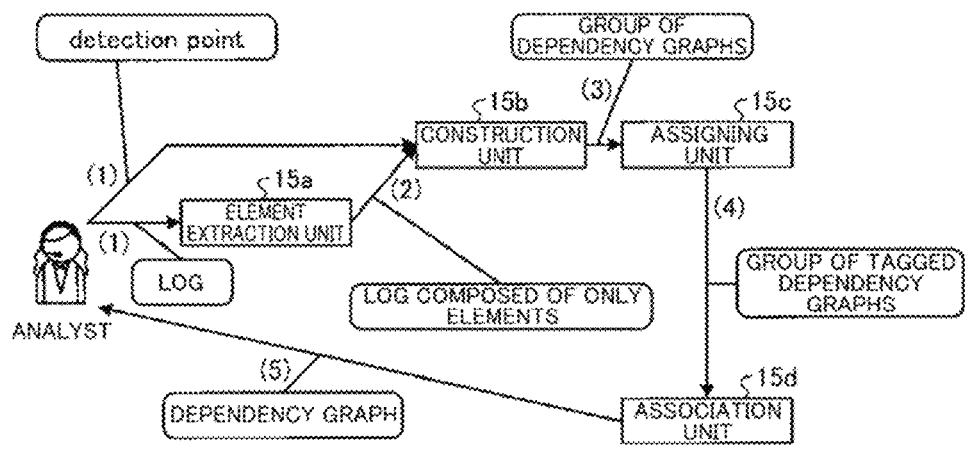
FIG. 3 is a diagram illustrating an overview of a graph association process by the information processing device.

Here, before explaining each unit, the overview of the graph association process by the information processing device will be described with reference to FIG. 3. FIG. 3 is a diagram illustrating an overview of graph association process by the information processing device. As illustrated in FIG. 3, when the log file is input to the element extraction unit 15a by the operation of the analyst and the log (detection point) that triggered the discovery of an attack is input to the construction unit 15b (see (1) in FIG. 3), the element extraction unit 15a receives the log file, extracts only the elements necessary for processing, and notifies the construction unit 15b of a log consisting of only the elements (see (2) in FIG. 3).

Then, the construction unit 15b constructs dependency graphs using an existing causality analysis method, and notifies the assigning unit 15c of the group of dependency graphs (see (3) in FIG. 3). Here, the construction unit 15b continues to construct the dependency graphs until all the logs recorded before the log (detection point) that triggered the detection of an attack belong to at least one of the dependency graphs.

Subsequently, the assigning unit 15c assigns tags to each dependency graph in order to associate the constructed dependency graphs with each other, and notifies the association unit 15d of the group of tagged dependency graphs (see (4) in FIG. 3). Here, the assigning unit 15c performs tagging based on the tag indicating Tactics and the signature information (trace indicating that an attack has been executed) corresponding to each tag.

For example, the assigning unit 15c performs tagging on the dependency graphs constructed by the construction unit 15b using the signature. Here, it is assumed that the signature is acquired from the trace (Indicator of Compromise) or the like indicating the presence of a threat described in ATT&CK or the like. For example, it is assumed that tags are assigned with reference to Tactics, Techniques and Procedures (TTPs), and have priorities corresponding to the stage of the attack.

Then, the association unit 15d associates the dependency graphs with each other using tags, and outputs the dependency graphs reconstructed according to the association (see (5) in FIG. 3). In the following, returning to the description of FIG. 2, the processing of each unit (the element extraction unit 15a, the construction unit 15b, the assigning unit 15c, and the association unit 15d) of the control unit 15 will be described.

The element extraction unit 15a receives a log file and extracts an element for each log recorded therein. The element extraction unit 15a extracts, for example, "recording time", "process ID", "parent process ID", "user ID", "command line", "destination address", "destination port", "filename", "DNS domain name", "IP address acquired by name resolution", "process name", "absolute path of GET request", "absolute path of POST request" and the like as elements to be extracted. The elements to be extracted are not limited thereto. Further, the element extraction unit 15a may add or delete elements.

Figure 4:
FIG. 4 is a diagram illustrating an example of an element extraction process by an element extraction unit.

FIG. 4 is a diagram illustrating an example of an element extraction process by the element extraction unit 15a. From the content of the log, the element extraction unit 15a extracts the recording time "2018-07-11T10:28:06.078110000Z", the destination address "192.168.56.101", the source address "10.0.2.15", the destination port "8080," and the source port "49636". Then, the element extraction unit 15a outputs a log composed of the extracted elements to the construction unit 15b. An external device may perform the processing of the element extraction unit 15a. That is, the information processing device 10 may receive, for example, a log including only the elements necessary for processing from the log holding device 20.

The construction unit 15b constructs a plurality of dependency graphs in which the input logs are associated with each other. For example, the construction unit 15b constructs a plurality of dependency graphs in which logs recorded before the log in which the attack was discovered are associated with each other.

More specifically, the construction unit 15b continues to construct the dependency graphs using a predetermined causality analysis method until all the logs recorded before the detection point belong to at least one of the dependency graphs. For example, the construction unit 15b constructs one or more dependency graphs by the following procedure using the causality analysis method.

1. A dependency graph is constructed from the detection point using the causality analysis method.
2. A dependency graph is constructed using the causality analysis method from the log which is not included in the dependency graphs constructed so far and is the log recorded latest among the logs recorded before the detection point.
3. Procedure 2 is continued until the log which is not included in the dependency graphs constructed so far and is the log recorded latest disappears.

Here, an operation example of Back Tracker will be described with reference to FIGS. 5 to 11. In the following description, Back Tracker is used as the causality analysis method, but the causality analysis method is not limited thereto. FIGS. 5 to 11 are diagrams for explaining an operation example of the Back Tracker.

Figure 5:
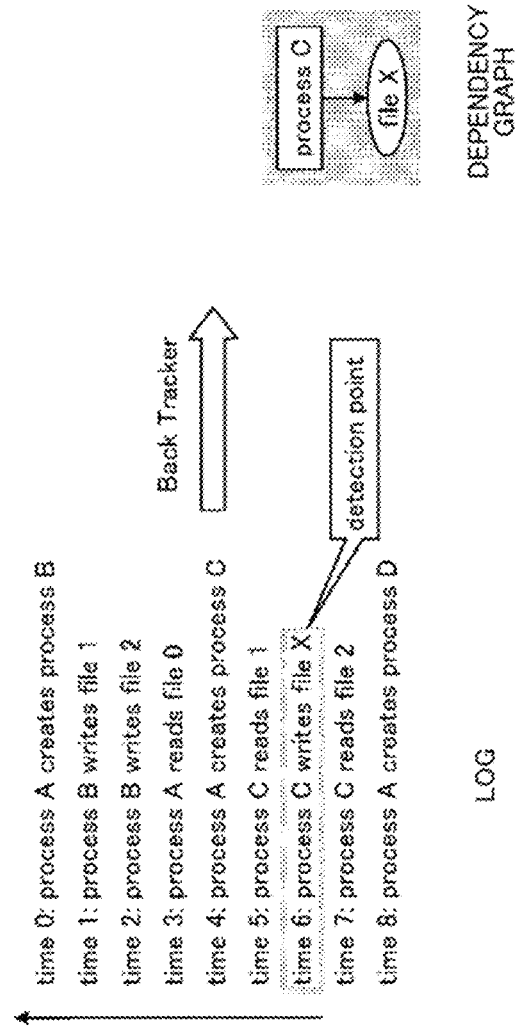
FIG. 5 is a diagram illustrating an operation example of the Back Tracker.

The construction unit 15b constructs a dependency graph by associating the logs in reverse chronological order using the log that triggered the detection of an attack as a detection point. First, as illustrated in FIG. 5, the Back Tracker constructs a dependency graph from "process C writes file X" which is a log at time 6 which is a detection point. That is, in the example of FIG. 5, the Back Tracker constructs a dependency graph in which "process C" and "file X" are used as nodes, and such nodes are connected by an arrow.

Figure 6:
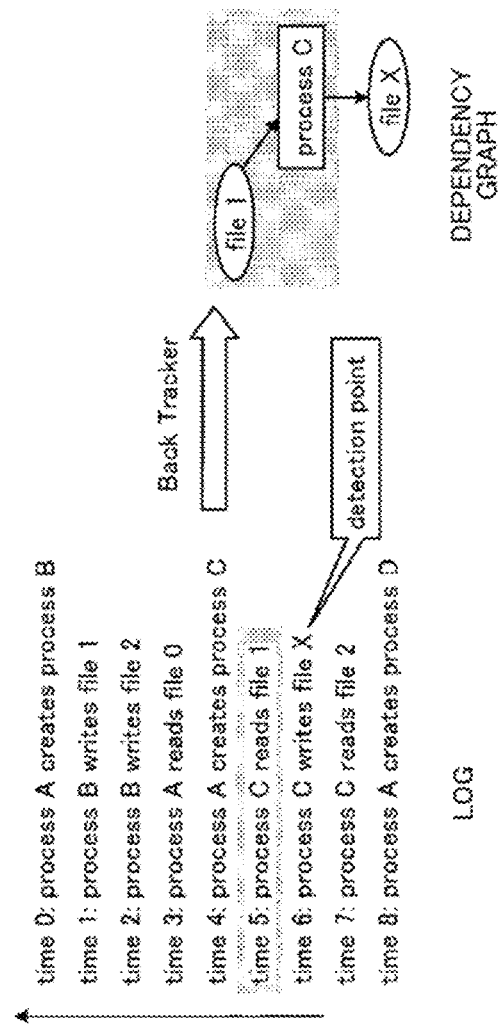
FIG. 6 is a diagram illustrating an operation example of the Back Tracker.

Subsequently, as illustrated in FIG. 6, the Back Tracker constructs a dependency graph from the log "process C reads file 1" at time 5, which is one time before time 6 of the detection point. That is, in the example of FIG. 6, the Back Tracker constructs a dependency graph in which the node of "process C" and the node of "file 1" are used as associated nodes and such nodes are connected by an arrow.

Figure 7:
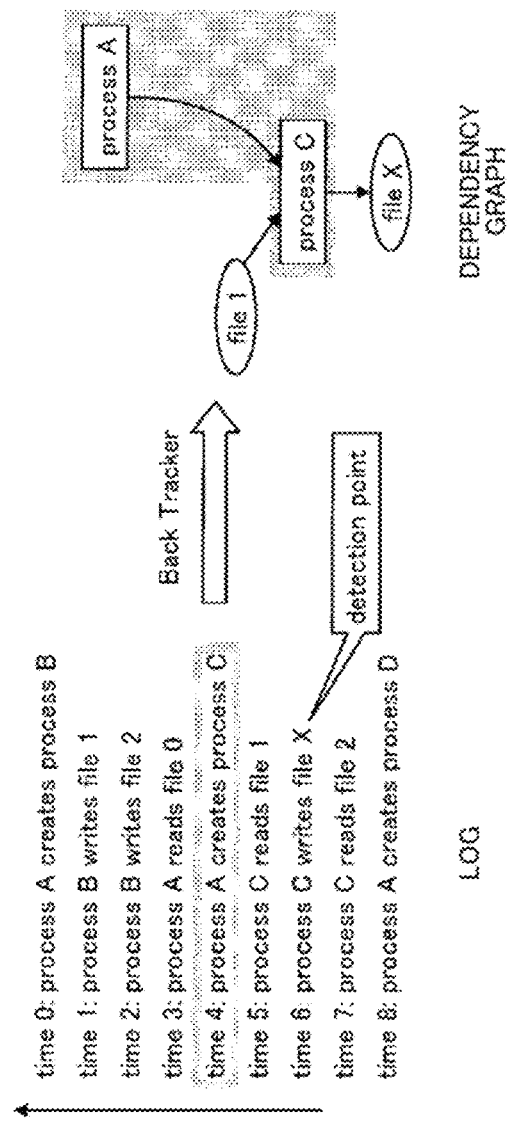
FIG. 7 is a diagram illustrating an operation example of the Back Tracker.

Subsequently, as illustrated in FIG. 7, the Back Tracker constructs a dependency graph from the log "process A creates process C" at time 4, which is one time before time 5. That is, in the example of FIG. 7, the Back Tracker constructs a dependency graph in which the node of "process C" and the node of "process A" are used as associated nodes and such nodes are connected by an arrow.

Figure 8:
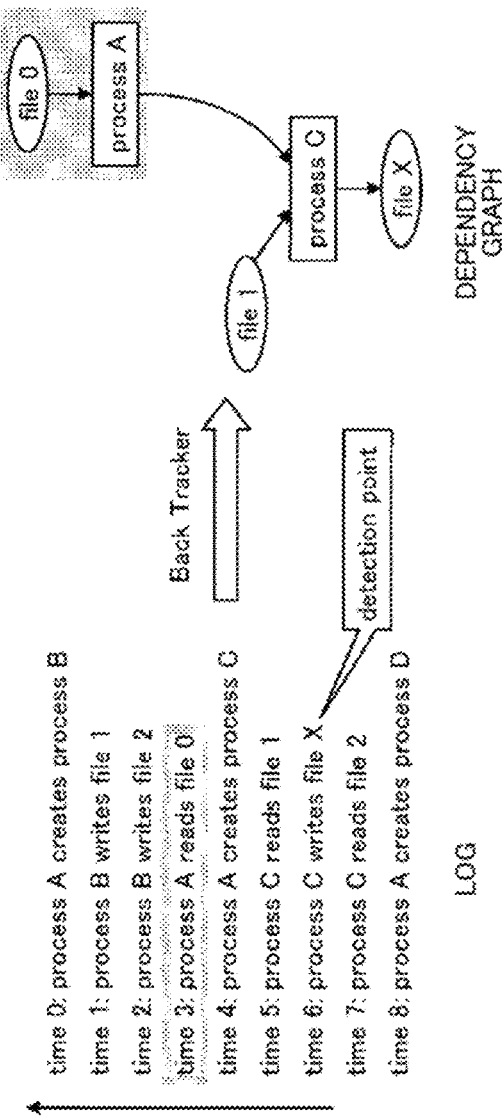
FIG. 8 is a diagram illustrating an operation example of the Back Tracker.

Subsequently, as illustrated in FIG. 8, the Back Tracker constructs a dependency graph from the log "process A reads file 0" at time 3 which is one time before time 4. That is, in the example of FIG. 8, the Back Tracker constructs a dependency graph in which the node of "process A" and the node of "file 0" are used as associated nodes and such nodes are connected by an arrow. It is assumed that the log "process B writes file 2" at time 2 which is one time before time 3 is not included in this dependency graph as a log having low relevance to the log at time 6 of the detection point.

Figure 9:
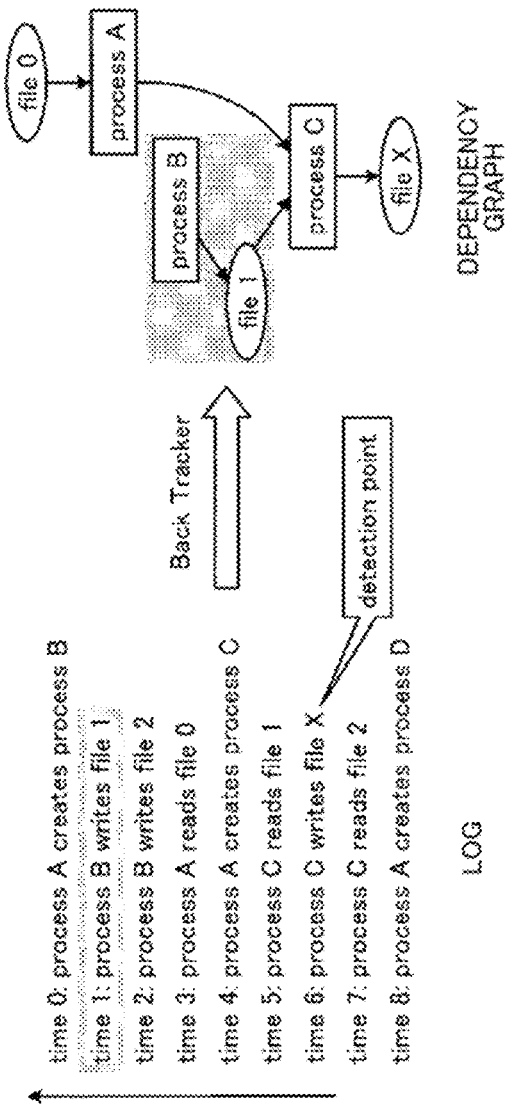
FIG. 9 is a diagram illustrating an operation example of the Back Tracker.

Subsequently, as illustrated in FIG. 9, the Back Tracker constructs a dependency graph from the log "process B writes file 1" at time 1 which is one time before time 2. That is, in the example of FIG. 9, the Back Tracker constructs a dependency graph in which the node of "process B" and the node of "file 1" are used as associated nodes and such nodes are connected by an arrow.

Figure 10:
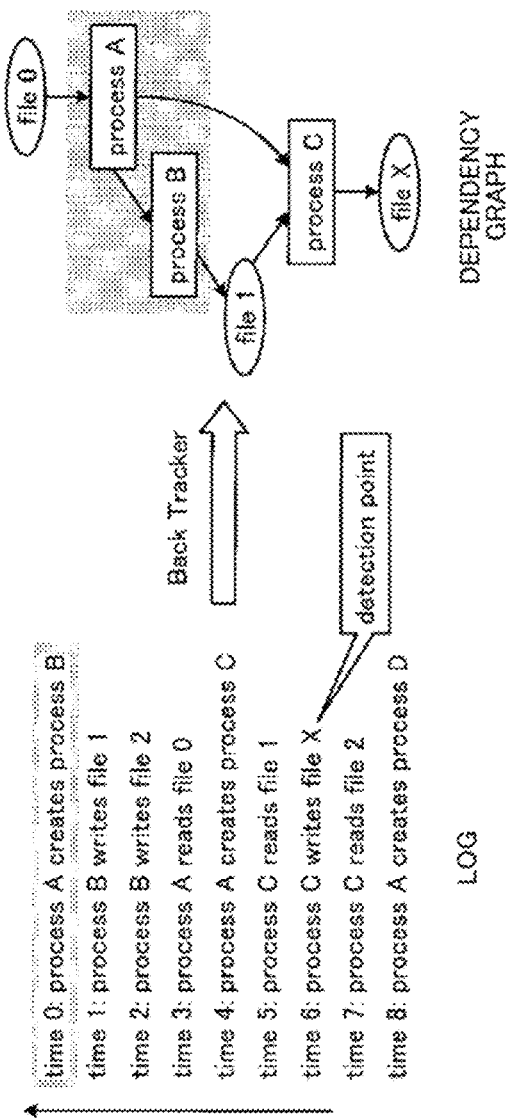
FIG. 10 is a diagram illustrating an operation example of the Back Tracker.

Subsequently, as illustrated in FIG. 10, the Back Tracker constructs a dependency graph from the log "process A creates process B" at time 0, which is one time before time 1. That is, in the example of FIG. 10, the Back Tracker constructs a dependency graph in which the node of "process A" and the node of "process B" are used as associated nodes and such nodes are connected by an arrow.

Figure 11:
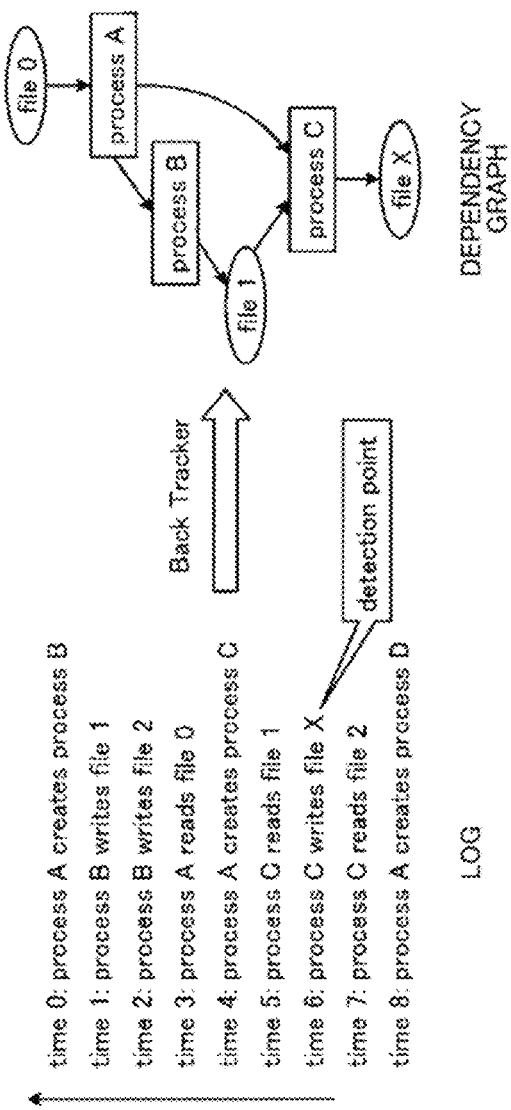
FIG. 11 is a diagram illustrating an operation example of the Back Tracker.

In this way, the Back Tracker performs the above-mentioned processing for constructing the dependency graph, and as illustrated in FIG. 11, constructs a dependency graph expressing the relationship between the logs by connecting the nodes with arrows.

Figure 12:
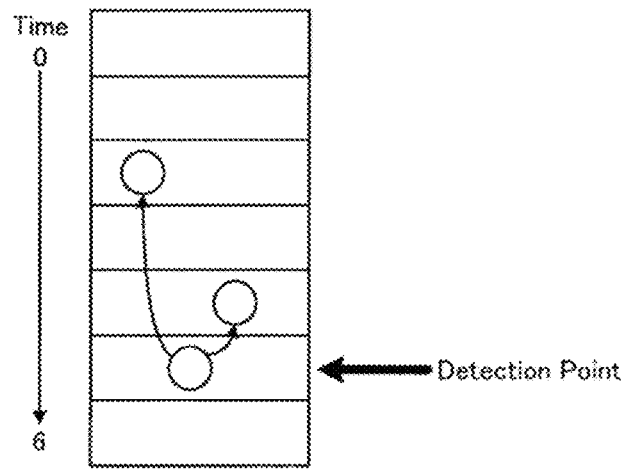
FIG. 12 is a diagram illustrating an example of an association process for each log by a construction unit.

The construction unit 15b associates the logs with each other from the detection point using the Back Tracker method described above. For example, as illustrated in FIG. 12, the construction unit 15b performs association from the detection point using the Back Tracker to construct a dependency model in which the log at time 5 and the log at time 4 are associated with the log at time 5 and the log at time 2.

Figure 13:
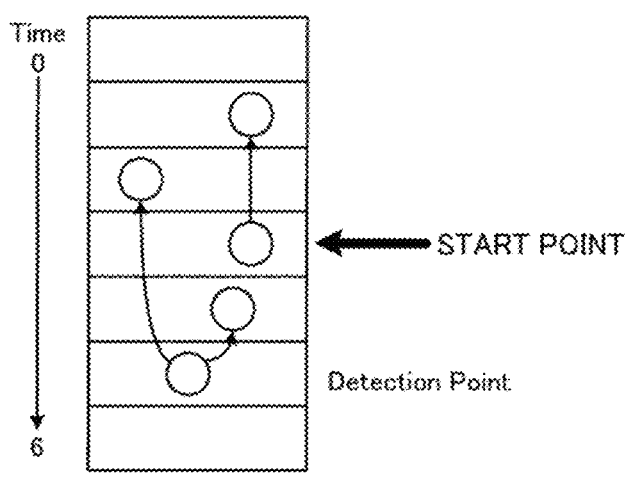
FIG. 13 is a diagram illustrating an example of association process for each log by the construction unit.

Subsequently, as illustrated in FIG. 13, the construction unit 15b starts associating the logs using the log closest to the detection point among the logs which are recorded before the detection point and are not associated by the Back Tracker as the start point.

In the example of FIG. 13, the log which is recorded before the detection point and is not associated by the Back Tracker is the log at time 3, and the construction unit 15b starts associating logs using the log at time 3 as the start point. Then, the construction unit 15b associates logs using the log at time 3 as the start point to create a dependency graph.

Figure 14:
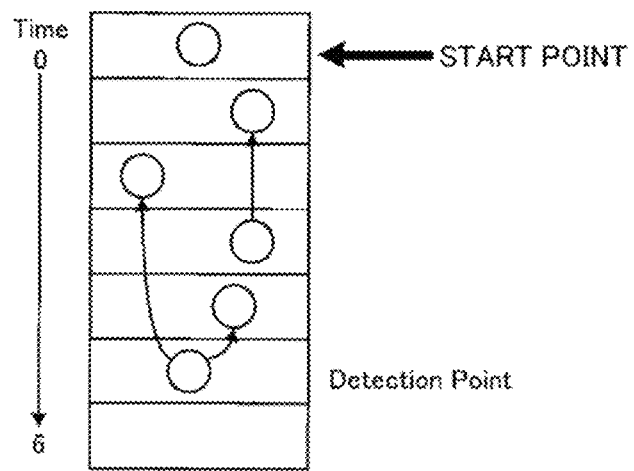
FIG. 14 is a diagram illustrating an example of association process for each log by the construction unit.

After that, as illustrated in FIG. 14, the construction unit 15b associates the logs using the log at time 0 as the start point, and creates a dependency graph. In this way, the construction unit 15b repeats the process of associating the logs and constructing the dependency model until time 0 is reached.

In this way, as a process for constructing a dependency graph, the construction unit 15b continues until all the logs recorded before the log (detection point) that triggered the attack discovery belong to one of the dependency graphs, and constructs a dependency graph expressing the relationship between logs by connecting the nodes by arrows.

Returning to the description of FIG. 2, the assigning unit 15c assigns tags to the dependency graphs constructed by the construction unit 15b. For example, the assigning unit 15c may assign a tag number indicating the stage of attack as a tag.

For example, the assigning unit 15c assigns a tag (Tactics ID) representing Tactics to the dependency graphs constructed by the construction unit 15b. Here, for Tactics, for example, the attacker's attack method ATT&CK (see MITER ATT&CK, https://attack.mitre.org) is used. ATT&CK is a security framework created by analyzing attackers' attack methods and Tactics.

Figure 15:
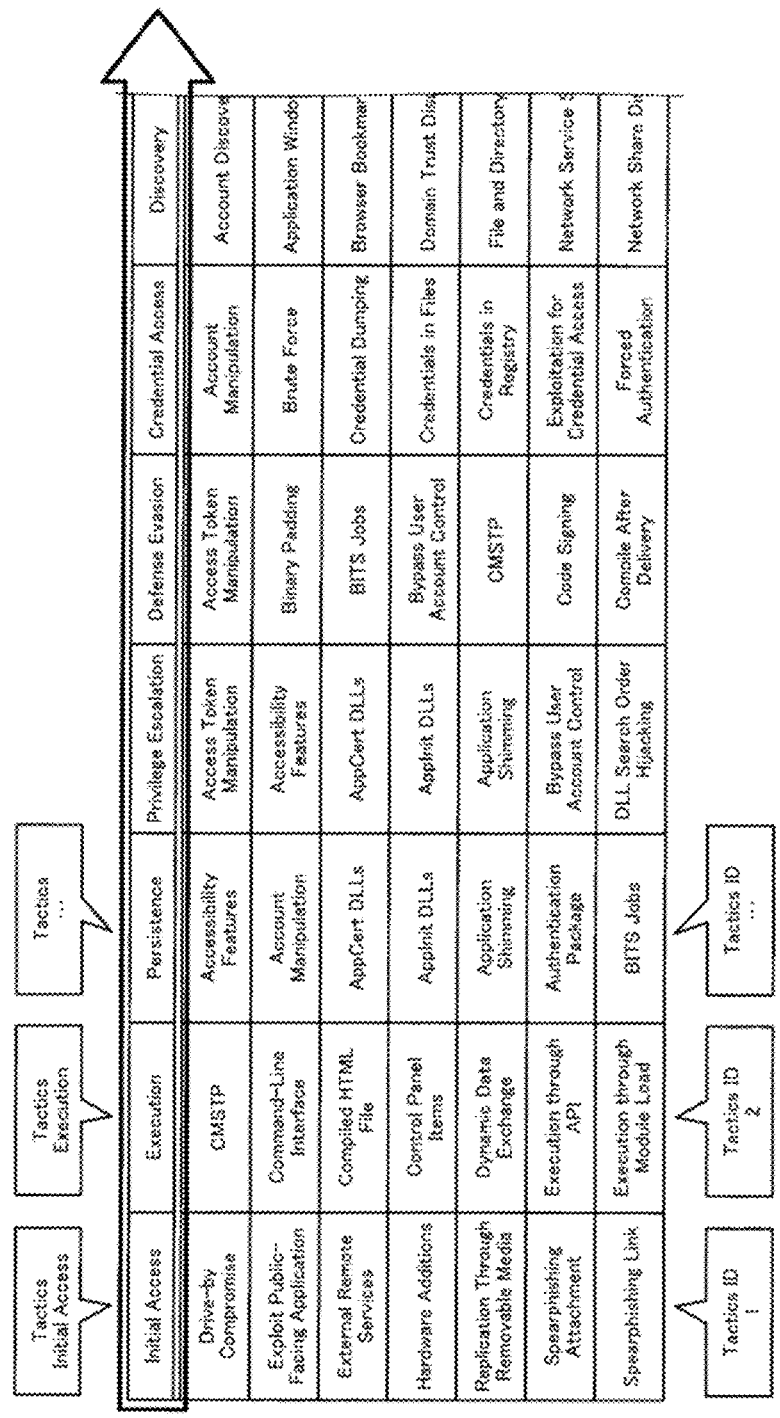
FIG. 15 is a diagram illustrating an example of a tag assigned to a dependency graph by an assigning unit.

Here, an example of a tag assigned to the dependency graph by the assigning unit 15c will be described with reference to FIG. 15. FIG. 15 is a diagram illustrating an example of a tag assigned to the dependency graph by the assigning unit 15c. The example of FIG. 15 illustrates a security framework created by analyzing attackers' attack methods and Tactics, and TTPs (Tactics, Techniques and Procedures) transitioning from left to right illustrates the transition (life cycle) of attacks. Further, in the example of FIG. 15, the tag of Tactics "Initial Access" is Tactics ID "1", and the tag of Tactics "Execution" is Tactics ID "2".

It is assumed that signature for the tags are prepared in advance. For example, signatures are acquired from ATT&CK or the like. The signature is a trace indicating that an attack has been executed, and shall be described by a regular expression. Here, an example of signatures for tags will be described with reference to FIG. 16. FIG. 16 is a diagram illustrating an example of signatures for tags. As illustrated in FIG. 16, it is assumed that a signature is set for each set of Tactics and Tactics ID. A signature is a trace left when an attacker executes an attack method.

For example, it is assumed that the signature is acquired from ATT&CK. FIG. 17 is a diagram illustrating an example of a signature acquired from ATT&CK. ATT&CK describes the attack method used by the attacker and its details. In the details, as illustrated in FIG. 17, traces (character strings surrounded by a frame) left when an attacker executes the attack method are described. In this embodiment, this trace is used as a signature. It should be noted that the present invention is not limited to the case where the signature is acquired from ATT&CK, and other signature acquisition methods may be used. For example, a signature independently acquired by the user may be used.

Figure 18:
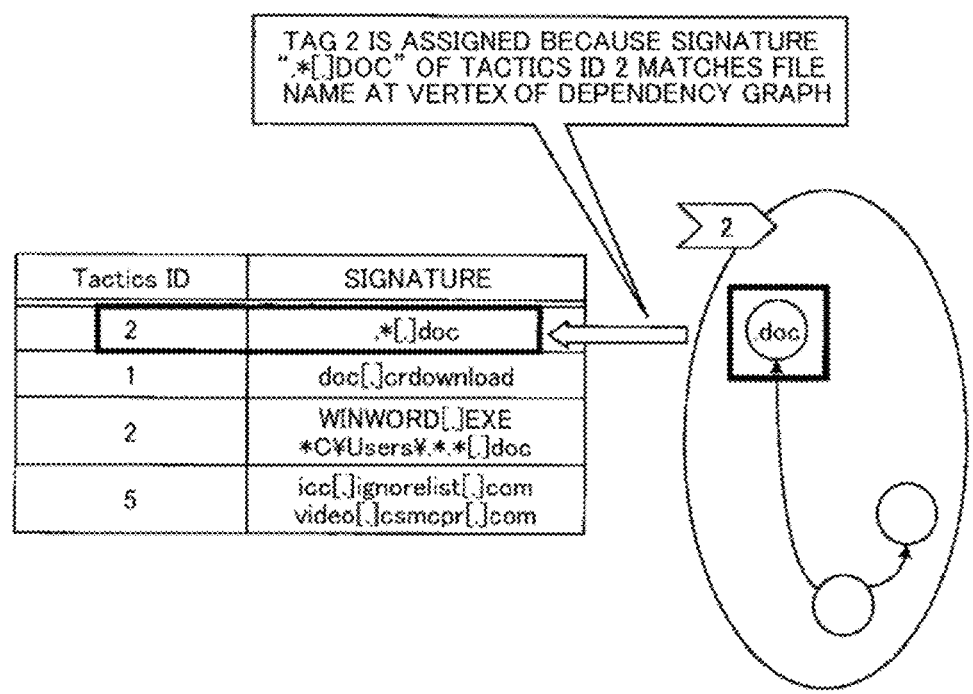
FIG. 18 is a diagram illustrating an example of a tag assigning process by the assigning unit.

Next, a tag assigning process by the assigning unit 15c will be described with reference to FIG. 18. FIG. 18 is a diagram illustrating an example of a tag assigning processing by the assigning unit. The assigning unit 15c searches each dependency graph for a signature that matches information about the graph such as a file name. Then, when a matching signature is present, the assigning unit 15c assigns a tag corresponding to the signature to the dependency graph.

For example, in the example of FIG. 18, since the signature ".*[.]doc" of the Tactics ID "2" matches the file name at a vertex of the dependency graph, the assigning unit 15c assigns "2" as a tag to the dependency graph.

Returning to the description of FIG. 2, the association unit 15d associates the dependency graphs with each other based on the tags assigned by the assigning unit 15c. For example, the association unit 15d performs association sequentially from a dependency graph with the larger tag numbers among the dependency graphs to which the tag numbers smaller than the tag numbers assigned to the dependency graph including the log in which the attack is discovered are assigned among a plurality of dependency graphs constructed by the construction unit 15b. That is, the association unit 15d starts processing from the dependency graph including the log (detection point) in which the attack is discovered, and associates dependency graphs assigned with the closest tag numbers among the tag numbers smaller than the Tactics ID assigned to the dependency graph.

Here, the association process in graph units by the association unit 15d will be described with reference to the examples of FIGS. 19 to 23. FIGS. 19 to 23 are diagrams illustrating an example of an association process in graph units by the association unit 15d. In the example of FIGS. 19 to 23, the dependency graphs $G_0$ to $G_6$ are a plurality of dependency graphs constructed by the construction unit 15b. Further, in the examples of FIGS. 19 to 23, for the tags assigned by the assigning unit 15c, the Tactics ID of the dependency graph $G_0$ is "5", the Tactics ID of the dependency graphs $G_3$ and $G_5$ is "4", and the Tactics ID of the dependency graphs $G_1$ and $G_6$ is "3".

Figure 19:
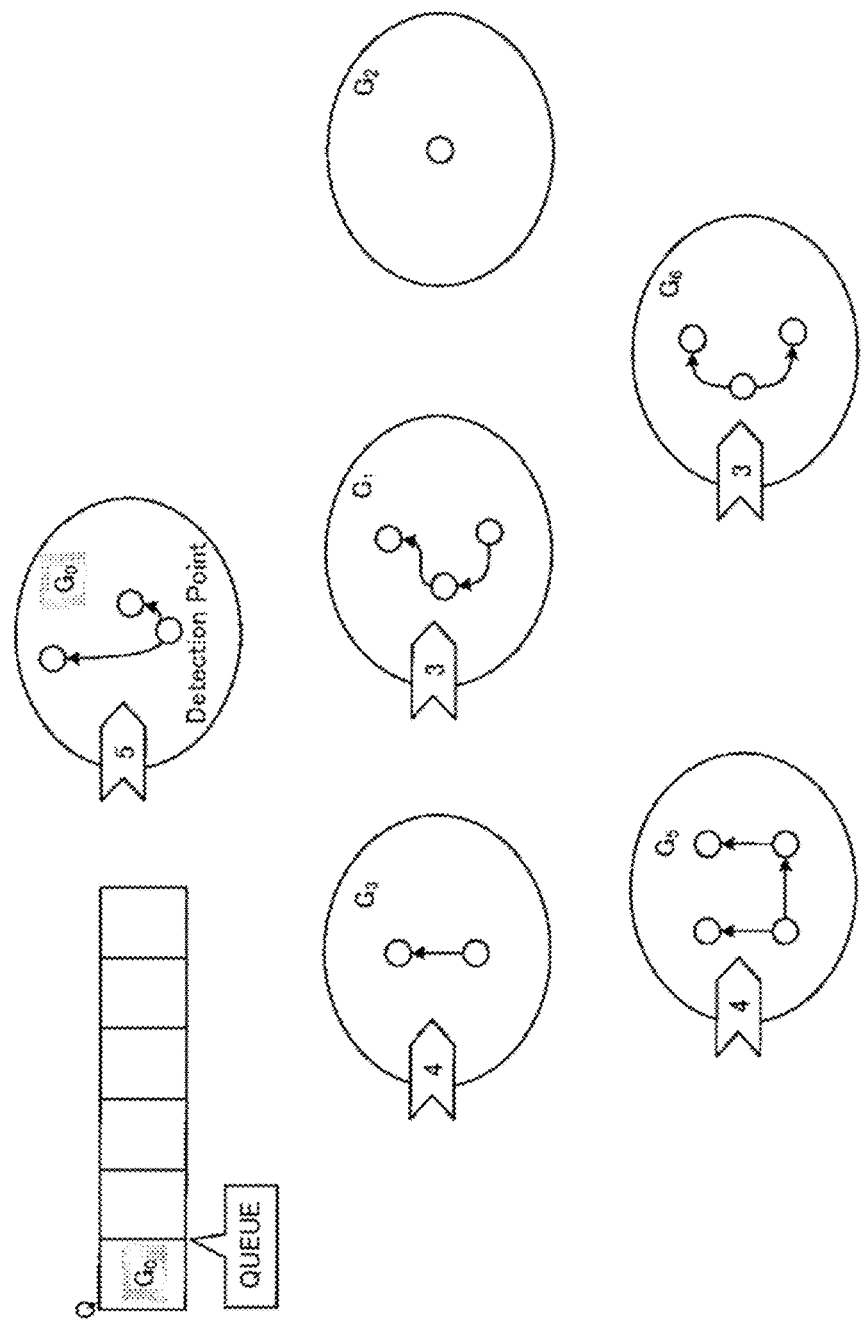
FIG. 19 is a diagram illustrating an example of an association process for each graph by an association unit.

As illustrated in FIG. 19, the association unit 15d adds a graph including a detection point into a queue for a group of dependency graphs constructed by the Back Tracker. In the example of FIG. 19, the association unit 15d adds the graph $G_0$ into a queue.

Figure 20:
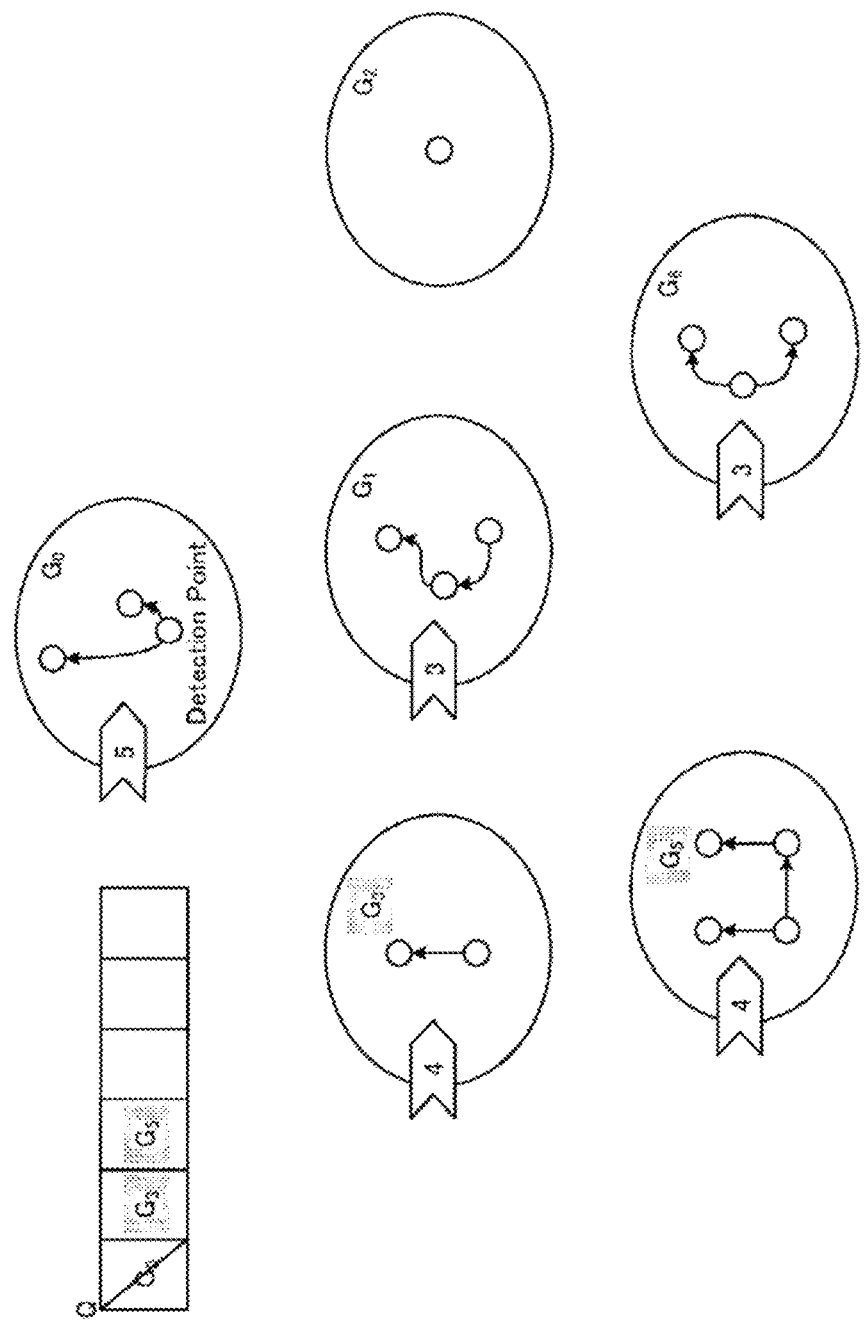
FIG. 20 is a diagram illustrating an example of an association process for each graph by the association unit.

Subsequently, as illustrated in FIG. 20, the association unit 15d extracts one dependency graph from the head of the queue. Let G be the extracted dependency graph, and a dependency graph that satisfies the following conditions 1 and 2 is added into a queue.
(Condition 1)
Assigned Tactics ID is assigned to any of the graphs.
(Condition 2)
Assigned Tactics ID is less than the Tactics ID of the dependency graph G and is closest to the Tactics ID of the dependency graph G.

In the example of FIG. 20, since the Tactics ID of the dependency graph G is "5", the association unit 15d adds the graphs $G_3$ and $G_5$ of which the Tactics ID "4" satisfies the above-mentioned conditions into a queue.

Figure 21:
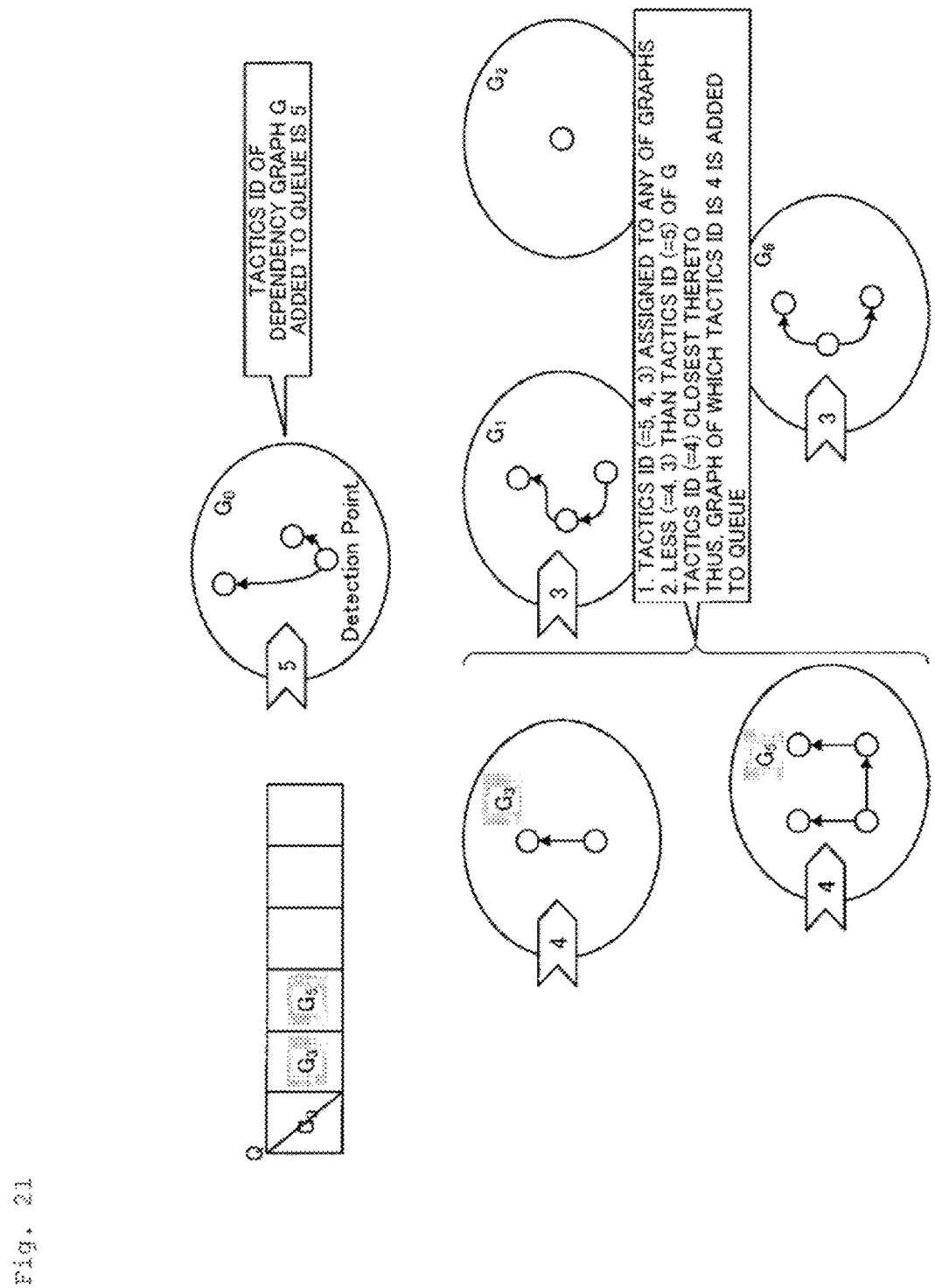
FIG. 21 is a diagram illustrating an example of an association process for each graph by the association unit.

That is, as illustrated in FIG. 21, the Tactics ID of the queued dependency graph G is "5". Since the Tactics IDs assigned to any of the graphs are "5", "4", and "3", the association unit 15d adds the dependency graphs $G_3$ and $G_5$ of which the Tactics IDs "4" are less than the Tactics ID "5" of the dependency graph G and are closest to the Tactics ID "5" of the dependency graph G into a queue.

Figure 22:
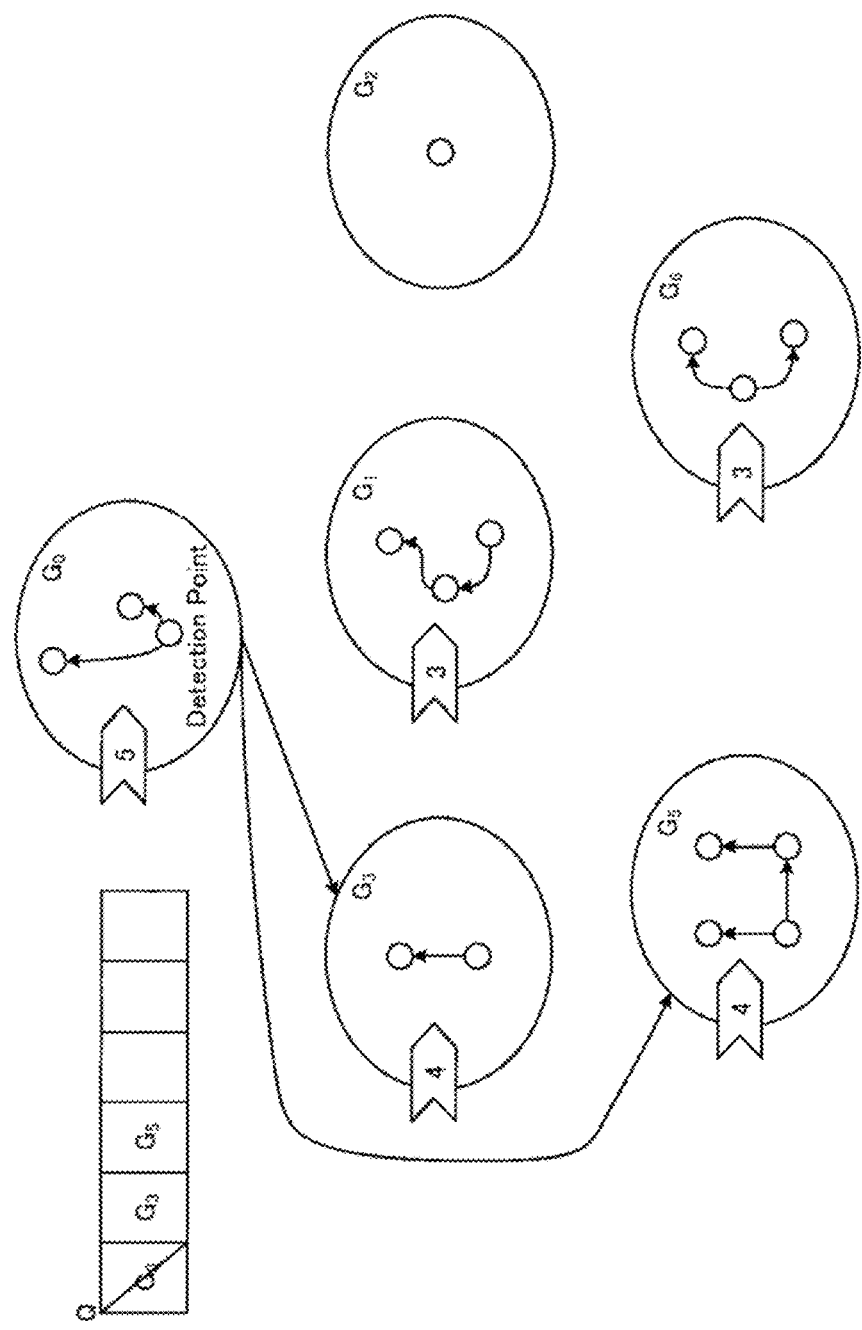
FIG. 22 is a diagram illustrating an example of an association process for each graph by the association unit.

Then, as illustrated in FIG. 22, the association unit 15d associates the dependency graph G with the newly queued dependency graphs. In the example of FIG. 22, the association unit 15d connects the dependency graph G ($G_0$) and the dependency graphs $G_3$ and $G_5$ with arrows.

Figure 23:
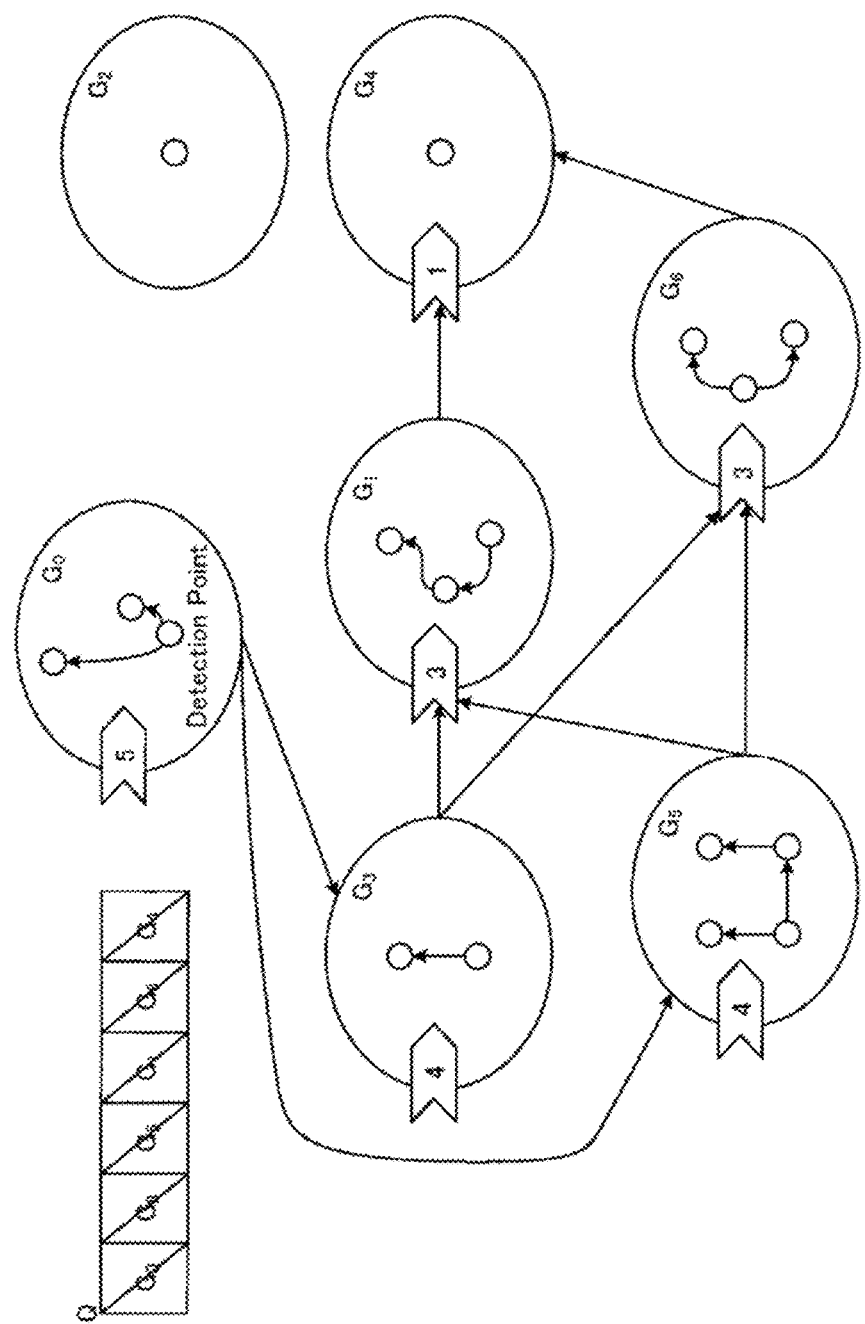
FIG. 23 is a diagram illustrating an example of an association process for each graph by the association unit.

After that, the association unit 15d sets the dependency graphs $G_3$ and $G_5$ as the dependency graph G, and similarly adds the dependency graphs satisfying the above-mentioned conditions 1 and 2 into a queue and associates the dependency graph G with the newly queued dependency graphs. The association unit 15d repeats such processing until there is no associated dependency graph, so that the dependency graphs are associated with each other as illustrated in FIG. 23.

In this way, the information processing device 10 can reconstruct dependency graphs representing a series of actions of an attacker by assigning tags to a plurality of dependency graphs and associating the dependency graphs using the tags. Therefore, the information processing device 10 can associate logs that were not associated in the conventional method to construct dependency graphs.

For example, the information processing device 10 can construct a dependency graph including all actions of an attacker even when all OS-level actions are not recorded in the logs collected by an analyst from an environment where damage has occurred in the incident investigation.

Further, for example, the information processing device 10 can reduce the risk of missing a log necessary for clarifying the incident situation when an analyst investigates an incident using a dependency graph.

[Processing Procedure of Information Processing Method]

Figure 24:
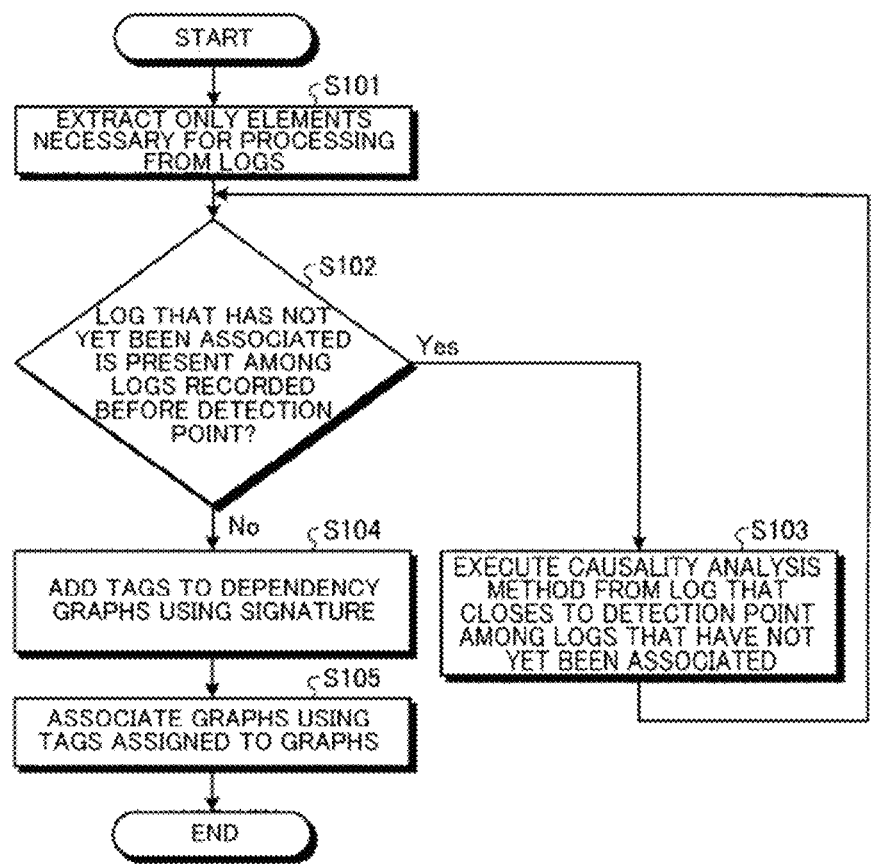
FIG. 24 is a flowchart illustrating a processing procedure of an information processing method according to the embodiment.

Next, the processing procedure of the information processing method by the information processing device 10 will be described. FIG. 24 is a flowchart illustrating a processing procedure of the information processing method according to the embodiment.

As illustrated in FIG. 24, the element extraction unit 15a of the information processing device 10 extracts only the elements necessary for processing for each input log (step S101), and outputs a log composed of only the extracted elements to the construction unit 15b.

Then, the construction unit 15b determines whether there is a log that has not yet been associated among the logs recorded before the detection point (step S102). As a result, when it is determined that there is an unassociated log among the logs recorded before the detection point (step S102: Yes), the construction unit 15b performs the causality analysis method (for example, Back Tracker) from a log closer to the detection point than the logs that have not yet been associated (step S103) to construct a dependency graph.

Then, returning to step S102, the construction unit 15b repeats the process of S103 until there is no unassociated log. On the other hand, when the construction unit 15b determines that there is no unassociated log among the logs recorded before the detection point (step S102: No), the assigning unit 15c assigns tags to each dependency graph using a signature (step S104).

After that, the association unit 15d associates the dependency graphs with each other using the tags assigned to the dependency graphs (step S105). After that, the association unit 15d may reconstruct the dependency graphs based on the association between the dependency graphs and output the reconstructed dependency graphs. An analyst investigates the incident use the dependency graphs.

[Effect of embodiment] In this way, the information processing device 10 of the graph association system 100 according to the embodiment constructs a plurality of dependency graphs in which the input logs are associated with each other. Then, the information processing device 10 assigns tags to the constructed dependency graphs. Subsequently, the information processing device 10 associates the dependency graphs with each other based on the assigned tags. As a result, the information processing device 10 can appropriately construct the dependency graphs even when all the OS-level actions are not recorded in the logs.

That is, for example, the information processing device 10 can reconstruct dependency graphs representing a series of attacker's actions by assigning tags to a plurality of dependency graphs and associating the dependency graphs using the tags and can associate logs that were not associated in the conventional method to construct dependency graphs.

As a result, for example, the information processing device 10 can construct a dependency graph including all actions of an attacker even when all OS-level actions are not recorded in the logs collected by an analyst from an environment where damage has occurred in the incident investigation.

Further, for example, the information processing device 10 can reduce the risk of missing a log necessary for clarifying the incident situation when an analyst investigates an incident using a dependency graph.

[System configuration and the like] The components of the devices illustrated in the drawings are functionally conceptual and are not necessarily physically configured as illustrated in the drawings. In other words, the specific aspects of distribution and integration of the devices are not limited to those illustrated in the drawings. All or part of the components may be distributed or integrated functionally or physically in desired units depending on various kinds of loads and states of use, for example. All or desired part of the processing functions performed by the devices are provided by a CPU or a program analyzed and executed by the CPU or as hardware by wired logic.

All or part of the processes described as being automatically performed among the processes described in the present embodiment may be performed manually. Alternatively, all or part of the processes described as being manually performed may be performed automatically by a known method. In addition, the processing procedures, the control procedures, the specific names, and the information including various kinds of data and parameters described in the present specification and the drawings can be arbitrarily changed unless there is any special mention.

Figure 25:
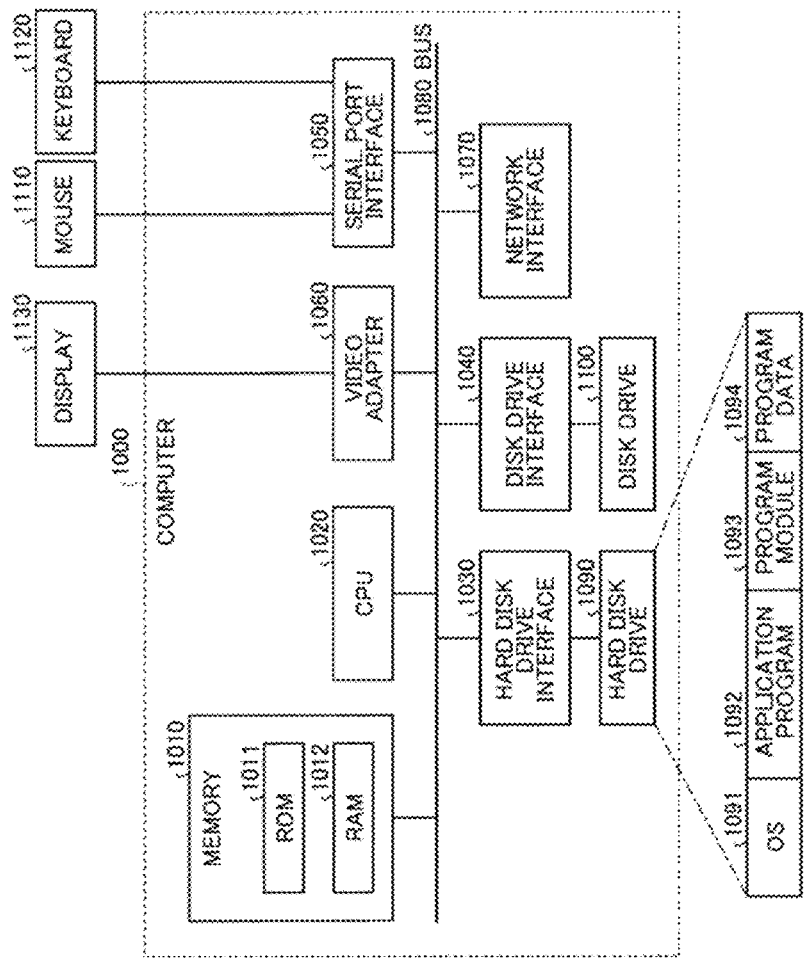
FIG. 25 is a diagram illustrating an example of a computer in which an information processing device is realized by execution of a program.

[Program] FIG. 25 is a diagram illustrating an example of a computer in which the information processing device 10 is realized by executing a program. A computer 1000 has, for example, a memory 1010 and a CPU 1020. The computer 1000 also has a hard disk drive interface 1030, a disk drive interface 1040, a serial port interface 1050, a video adapter 1060, and a network interface 1070. These units are connected by a bus 1080.

The memory 1010 includes a ROM (Read Only Memory) 1011 and a RAM 1012. The ROM 1011 stores, for example, a boot program such as a BIOS (Basic Input Output System). The hard disk drive interface 1030 is connected to the hard disk drive 1090. The disk drive interface 1040 is connected to the disk drive 1100. For example, a removable storage medium such as a magnetic disk or an optical disk is inserted into the disk drive 1100. The serial port interface 1050 is connected to, for example, a mouse 1110 and a keyboard 1120. The video adapter 1060 is connected to, for example, the display 1130.

The hard disk drive 1090 stores, for example, an OS (Operating System) 1091, an application program 1092, a program module 1093, and program data 1094. That is, the program that defines each process of the information processing device 10 is implemented as the program module 1093 in which a code that can be executed by a computer is described. The program module 1093 is stored in, for example, the hard disk drive 1090. For example, the program module 1093 for executing the same processing as the functional configuration of the information processing device 10 is stored in the hard disk drive 1090. The hard disk drive 1090 may be replaced by an SSD (Solid State Drive).

Further, the setting data used in the processing of the above-described embodiment is stored as program data 1094 in, for example, a memory 1010 or a hard disk drive 1090. Then, the CPU 1020 reads the program module 1093 and the program data 1094 stored in the memory 1010 and the hard disk drive 1090 into the RAM 1012 as needed, and executes the program.

The program module 1093 and the program data 1094 are not limited to being stored in the hard disk drive 1090, but may be stored in, for example, a removable storage medium and read by the CPU 1020 via the disk drive 1100 or the like. Alternatively, the program module 1093 and the program data 1094 may be stored in another computer connected via a network (LAN, WAN (Wide Area Network), and the like). Then, the program module 1093 and the program data 1094 may be read by the CPU 1020 from another computer via the network interface 1070.

While an embodiment to which the invention made by the present inventor has been described, the present invention is not limited to the description and the drawings which form a part of the disclosure of the present invention according to the present embodiment. That is, other embodiments, examples, operation techniques, and the like performed by those skilled in the art based on the present embodiment fall within the scope of the present invention.

REFERENCE SIGNS LIST

10 Information processing device
11 Communication unit
12 Input unit
13 Output unit
14 Storage unit
15 Control unit
15a Element extraction unit
15b Construction unit
15c Assigning unit
15d Association unit
100 Graph association system

The invention claimed is:

1. A graph association system comprising:
processing circuitry configured to:
construct a plurality of dependency graphs in which input logs are associated with each other;
assign a tag to each of the dependency graphs including assigning a first tag to a first of the dependency graphs in which first input logs are associated with each other and assigning a second tag to a second of the dependency graphs in which second input logs are associated with each other; and
associate the dependency graphs with each other based on the tags including associating the first of the dependency graphs and the second of the dependency graphs based upon the first tag and the second tag.

2. The graph association system according to claim 1, wherein the processing circuitry is further configured to construct the plurality of dependency graphs to include at least one dependency graph in which logs recorded before a log in which an attack is discovered, among the input logs, are associated with each other.

3. The graph association system according to claim 1, wherein the processing circuitry is further configured to
assign a tag number indicating a stage of an attack as the tag, and
associate the dependency graphs sequentially from a dependency graph having a larger tag number among dependency graphs assigned with tag numbers smaller than a tag number assigned to a dependency graph including a log in which the attack is discovered.

4. A graph association method comprising:
constructing, via processing circuitry, a plurality of dependency graphs in which input logs are associated with each other;
assigning, via the processing circuitry, a tag to each of the dependency graphs including assigning a first tag to a first of the dependency graphs in which first input logs are associated with each other and assigning a second tag to a second of the dependency graphs in which second input logs are associated with each other; and
associating, via the processing circuitry, the dependency graphs with each other based on the tags including associating the first of the dependency graphs and the second of the dependency graphs based upon the first tag and the second tag.

5. The graph association system according to claim 1, wherein
the first tag and the second tag each indicate a stage in an attack, and
the processing circuitry is further configured to associate the first of the dependency graphs and the second of the dependency graphs sequentially from one of the first of the dependency graphs and the second of the dependency graphs having a larger tag number.

6. The graph association system according to claim 5, wherein the processing circuitry is configured to associate the one of the first of the dependency graphs and the second of the dependency graphs having the larger tag number with a dependency graph including a log in which an attack is discovered.

7. The graph association system according to claim 5, wherein the processing circuitry is configured to associate two of the dependency graphs having a same tag number to a dependency graph having a tag number that is one integer greater than the same tag number.

8. The graph association system according to claim 1, wherein the processing circuitry is configured to construct the plurality of dependency graphs by:
receiving a plurality of log files,
extracting elements from each of the log files,
construct the dependency graphs based upon only the elements extracted from the log files.

9. The graph association system according to claim 1, wherein the elements include one or more of:
a recording time,
a process ID,
a parent process ID,
a user ID,
a command line,
a destination address,
a destination port,
a filename,
a DNS domain name,
an IP address acquired by name resolution,
a process name,
an absolute path of a GET request, and
an absolute path of POST request.

10. The graph association system according to claim 3, wherein the processing circuitry is configured to associate the dependency graph having the larger tag number with the dependency graph including the log in which the attack is discovered.

11. The graph association system according to claim 1, wherein
the first tag corresponds to all elements of the first of the dependency graphs, and
the second tag corresponds to all elements of the second of the dependency graphs.

12. The graph association system according to claim 1, wherein
the first tag corresponds to all logs of the first of the dependency graphs, and
the second tag corresponds to all logs of the second of the dependency graphs.

13. The graph association system according to claim 1, wherein
the first tag corresponds to the entirety of the first of the dependency graphs, and
the second tag corresponds to the entirety of the second of the dependency graphs.

14. The graph association system according to claim 1, wherein the processing circuitry is configured to construct the plurality of dependency graphs after an attack is discovered.

* * * * *